(12) United States Patent
Stange et al.

(10) Patent No.: US 7,793,147 B2
(45) Date of Patent: Sep. 7, 2010

(54) METHODS AND SYSTEMS FOR PROVIDING RECONFIGURABLE AND RECOVERABLE COMPUTING RESOURCES

(75) Inventors: Kent Stange, Phoenix, AZ (US);
Richard Hess, Glendale, AZ (US);
Gerald B Kelley, Glendale, AZ (US);
Randy Rogers, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 883 days.

(21) Appl. No.: 11/458,301

(22) Filed: Jul. 18, 2006

(65) Prior Publication Data
US 2008/0022151 A1    Jan. 24, 2008

(51) Int. Cl.
*G06F 11/00* (2006.01)
(52) U.S. Cl. .............................. 714/13; 714/12; 714/16
(58) Field of Classification Search .................. 714/4, 714/11, 12, 13, 15, 16
See application file for complete search history.

(56) References Cited

U.S. PATENT DOCUMENTS

| | | |
|---|---|---|
| 4,345,327 A | 8/1982 | Thuy |
| 4,453,215 A | 6/1984 | Reid |
| 4,751,670 A | 6/1988 | Hess |
| 4,996,687 A | 2/1991 | Hess et al. |
| 5,086,429 A | 2/1992 | Gray et al. |
| 5,313,625 A | 5/1994 | Hess et al. |
| 5,550,736 A | 8/1996 | Hay et al. |
| 5,732,074 A | 3/1998 | Spaur et al. |
| 5,757,641 A | 5/1998 | Minto |
| 5,903,717 A | 5/1999 | Wardrop |
| 5,909,541 A | 6/1999 | Sampson et al. |
| 5,915,082 A | 6/1999 | Marshall et al. |

(Continued)

FOREIGN PATENT DOCUMENTS

EP    0363863    4/1990

(Continued)

OTHER PUBLICATIONS

Lee, "Design and Evaluation of a Fault-Tolerant Multiprocessor Using Hardware Recovery Blocks", Aug. 1982, pp. 1-19, Publisher: University of Michigan Computing Research Laboratory, Published in: Ann Arbor, MI.

(Continued)

*Primary Examiner*—Joshua A Lohn
(74) *Attorney, Agent, or Firm*—Fogg & Powers LLC (57) ABSTRACT

A method for optimizing the use of digital computing resources to achieve reliability and availability of the computing resources is disclosed. The method comprises providing one or more processors with a recovery mechanism, the one or more processors executing one or more applications. A determination is made whether the one or more processors needs to be reconfigured. A rapid recovery is employed to reconfigure the one or more processors when needed. A computing system that provides reconfigurable and recoverable computing resources is also disclosed. The system comprises one or more processors with a recovery mechanism, with the one or more processors configured to execute a first application, and an additional processor configured to execute a second application different than the first application. The additional processor is reconfigurable with rapid recovery such that the additional processor can execute the first application when one of the one more processors fails.

20 Claims, 5 Drawing Sheets

U.S. PATENT DOCUMENTS

| | | | |
|---|---|---|---|
| 5,949,685 A | | 9/1999 | Greenwood et al. |
| 6,058,491 A | | 5/2000 | Bossen et al. |
| 6,065,135 A | | 5/2000 | Marshall et al. |
| 6,115,829 A | | 9/2000 | Slegel et al. |
| 6,134,673 A | * | 10/2000 | Chrabaszcz .................. 714/13 |
| 6,141,770 A | | 10/2000 | Fuchs et al. |
| 6,163,480 A | | 12/2000 | Hess et al. |
| 6,185,695 B1 | * | 2/2001 | Murphy et al. .................. 714/4 |
| 6,189,112 B1 | | 2/2001 | Slegel et al. |
| 6,279,119 B1 | | 8/2001 | Bissett et al. |
| 6,367,031 B1 | | 4/2002 | Yount |
| 6,393,582 B1 | | 5/2002 | Klecka et al. |
| 6,467,003 B1 | | 10/2002 | Doerenberg et al. |
| 6,560,617 B1 | * | 5/2003 | Winger et al. ............... 707/204 |
| 6,574,748 B1 | | 6/2003 | Andress et al. |
| 6,600,963 B1 | | 7/2003 | Loise et al. |
| 6,625,749 B1 | | 9/2003 | Quach |
| 6,751,749 B2 | | 6/2004 | Hofstee et al. |
| 6,772,368 B2 | | 8/2004 | Dhong et al. |
| 6,789,214 B1 | | 9/2004 | De Bonis-Hamelin et al. |
| 6,813,527 B2 | | 11/2004 | Hess |
| 6,990,320 B2 | | 1/2006 | LeCren |
| 7,003,688 B1 | | 2/2006 | Pittelkow et al. |
| 7,062,676 B2 | * | 6/2006 | Shinohara et al. ............. 714/15 |
| 7,065,672 B2 | * | 6/2006 | Long et al. .................... 714/11 |
| 7,178,050 B2 | * | 2/2007 | Fung et al. ..................... 714/4 |
| 7,320,088 B1 | * | 1/2008 | Gawali et al. .................. 714/6 |
| 7,334,154 B2 | * | 2/2008 | Lorch et al. .................... 714/4 |
| 7,401,254 B2 | * | 7/2008 | Davies ........................ 714/11 |
| 2001/0025338 A1 | | 9/2001 | Zumkehr |
| 2002/0099753 A1 | | 7/2002 | Hardin et al. |
| 2002/0144177 A1 | | 10/2002 | Kondo et al. |
| 2003/0126498 A1 | | 7/2003 | Bigbee et al. |
| 2003/0177411 A1 | * | 9/2003 | Dinker et al. ................. 714/13 |
| 2003/0208704 A1 | | 11/2003 | Bartels et al. |
| 2004/0019771 A1 | | 1/2004 | Quach |
| 2004/0098140 A1 | | 5/2004 | Hess |
| 2004/0221193 A1 | | 11/2004 | Armstrong et al. |
| 2005/0022048 A1 | | 1/2005 | Crouch |
| 2005/0138485 A1 | | 6/2005 | Osecky et al. |
| 2005/0138517 A1 | | 6/2005 | Monitzer |
| 2006/0041776 A1 | | 2/2006 | Agrawal et al. |
| 2006/0085669 A1 | * | 4/2006 | Rostron et al. .................. 714/4 |
| 2006/0112308 A1 | * | 5/2006 | Crawford et al. .............. 714/12 |
| 2008/0016386 A1 | * | 1/2008 | Dror et al. ..................... 714/4 |

FOREIGN PATENT DOCUMENTS

| | | |
|---|---|---|
| EP | 0754990 | 1/1997 |
| EP | 1014237 A1 | 6/2000 |

OTHER PUBLICATIONS

Racine, "Design of a Fault-Tolerant Parallel Processor", 2002, pp. 13.D.2-1-13.D.2-10, Publisher: IEEE, Published in: US.

Dolezal, "Resource Sharing in a Complex Fault-Tolerant System", 1988, pp. 129-136, Publisher: IEEE.

Ku, "Systematic Design of Fault-Tolerant Mutiprocessors With Shared Buses", "IEEE Transactions on Computers", Apr. 1997, pp. 439-455, vol. 46, No. 4, Publisher: IEEE.

* cited by examiner

METHODS AND SYSTEMS FOR PROVIDING RECONFIGURABLE AND RECOVERABLE COMPUTING RESOURCES

The U.S. Government may have certain rights in the present invention as provided for by the terms of Contract No. NCC-1-393 with NASA.

BACKGROUND TECHNOLOGY

Computers have been used in digital control systems in a variety of applications, such as in industrial, aerospace, medical, scientific research, and other fields. In such control systems, it is important to maintain the integrity of the data produced by a computer. In conventional control systems, a computing unit for a plant is typically designed such that the resulting closed loop system exhibits stability, low-frequency command tracking, low-frequency disturbance rejection, and high-frequency noise attenuation. The "plant" can be any object, process, or other parameter capable of being controlled, such as aircraft, spacecraft, medical equipment, electrical power generation, industrial automation, a valve, a boiler, an actuator, or other controllable device.

It is well recognized that computing system components may fail during the course of operation from various types of failures or faults encountered during use of a control system. For example, a "hard fault" is a fault condition typically caused by a permanent failure of the analog or digital circuitry. For digital circuitry, a "soft fault" is typically caused by transient phenomena that may affect some digital circuit computing elements resulting in computation disruption, but does not permanently damage or alter the subsequent operation of the circuitry. For example, soft faults may be caused by electromagnetic fields created by high-frequency signals propagating through the computing system. Soft faults may also result from spurious intense electromagnetic signals, such as those caused by lightning that induce electrical transients on system lines and data buses which propagate to internal digital circuitry setting latches into erroneous states.

Unless the computing system is equipped with redundant components, one component failure normally means that the system will malfunction or cease all operation. A malfunction may cause an error in the system output. Fault tolerant computing systems are designed to incorporate redundant components such that a failure of one component does not affect the system output. This is sometimes called "masking."

In conventional control systems, various forms of redundancy have been used in an attempt to reduce the effects of faults in critical systems. Multiple processing units, for example, may be used within a computing system. In a system with three processing units, for example, if one processor is determined to be experiencing a fault, that processor may be isolated and/or shut down. The fault may be corrected by correct data, such as the current values of various control state variables, being transmitted (or "transfused") from the remaining processors to the isolated unit. If the faults in the isolated unit are corrected, the processing unit may be re-introduced to the computing system.

Functional reliability is often achieved by implementing redundancy in the system architecture whereby the level of redundancy is preserved without effects on the function being provided. Availability can be achieved by allocating extra hardware resources to maintain functional operation in the presence of faulted elements. There is a need, however, to minimize the hardware resources necessary to support reliability requirements and availability requirements in control systems.

BRIEF DESCRIPTION OF THE DRAWINGS

Features of the present invention will become apparent to those skilled in the art from the following description with reference to the drawings. Understanding that the drawings depict only typical embodiments of the invention and are not therefore to be considered limiting in scope, the invention will be described with additional specificity and detail through the use of the accompanying drawings, in which.

DETAILED DESCRIPTION

The present invention relates to methods and systems for providing one or more computing resources that are reconfigurable and recoverable wherever digital computing is applied, such as in a digital control system. The methods of the invention also provide for optimizing the use of digital computing resources to achieve reliability and availability of the computing resources. Such a method comprises providing one or more processors with a recovery mechanism, with the one or more processors executing one or more applications. A determination is made whether the one or more processors needs to be reconfigured. A rapid recovery is employed to reconfigure the one or more processors when needed. State data is continuously updated in the recovery mechanism, and the state data is used to transfuse the one or more processors for reconfiguration. This method provides for real-time reconfiguration transitions, and allows for a minimal set of hardware to achieve reliability and availability.

In general, reconfiguration is an action taken due to non-recoverable events (e.g., hard faults or hard failure) or use requirements (e.g., flight mission phase). A recovery action is generally taken due to a soft fault. The invention provides for application of a recovery action during a reconfiguration action. This combination of actions lessens the reconfiguration time and optimizes computing resource utilization. This combination of actions facilitates a more rapid reconfiguration of a computational element because current state data is maintained within a rapid recovery mechanism of a computing unit. The reconfiguration state data is pre-initialized with the state data maintained in a computing resource with rapid recovery capability, which allows a reconfigured computing resource to be brought on line much faster than if the state data were not available. The reconfiguration is rapid enough so that input/output staleness is not an issue.

Typically, the reconfiguration starts from or ends in a redundant/critical system. The hardware can be reconfigurable or can have a superset of functions. The invention enables a reduction in hardware that is employed to achieve reliability and availability for functions being provided by a digital computing system so that only a minimal set of hardware is required. The invention also enables the design of electronic system architectures that can better optimize the utilization of computing resources.

The rapid recovery mechanism may also be used to minimize the set of computing resources required to support varying computing resources throughout a specified use such as a mission. In phases where maximum reliability is required, computing resources may be reconfigured to perform redundant functionality. The reconfiguration occurs in a minimal time lag since the state data is maintained in the rapid recovery mechanism. In other phases of a mission where additional functionality is required to be available, the system may be reconfigured to provide the additional computing resources and may revert to the high integrity configuration at anytime since the state data is maintained in the rapid recovery mechanism. A typical system without a rapid recovery mechanism would require additional hardware to provide functionality that is only required during parts of a mission and would not be immediately reconfigurable to a higher reliability architecture by reutilizing hardware resources.

Further details with respect to the rapid recovery mechanism can be found in copending U.S. application Ser. No. 11/058,764, filed on Feb. 16, 2005, and entitled "FAULT RECOVERY FOR REAL-TIME, MULTI-TASKING COMPUTER SYSTEM," the disclosure of which is incorporated herein by reference.

In the following description, various embodiments of the present invention may be described in terms of various computer architecture elements and processing steps. It should be appreciated that such elements may be realized by any number of hardware or structural components configured to perform specified operations. For purposes of illustration only, exemplary embodiments of the present invention are sometimes described herein in connection with aircraft avionics. The invention is not so limited, however, and the systems and methods described herein may be used in any control environment. Further, it should be noted that although various components may be coupled or connected to other components within exemplary system architectures, such connections and couplings can be realized by direct connection between components, or by connection through other components and devices located therebetween. The following detailed description is, therefore, not to be taken in a limiting sense.

Instructions for carrying out the various process tasks, calculations, control functions, and the generation of signals and other data used in the operation of the systems and methods of the invention can be implemented in software, firmware, or other computer readable instructions. These instructions are typically stored on any appropriate computer readable medium used for storage of computer readable instructions or data structures. Such computer readable media can be any available media that can be accessed by a general purpose or special purpose computer or processor, or any programmable logic device.

Suitable computer readable media may comprise, for example, non-volatile memory devices including semiconductor memory devices such as EPROM, EEPROM, or flash memory devices; magnetic disks such as internal hard disks or removable disks (e.g., floppy disks); magneto-optical disks; CDs, DVDs, or other optical storage disks; nonvolatile ROM, RAM, and other like media. Any of the foregoing may be supplemented by, or incorporated in, specially-designed application-specific integrated circuits (ASICs). When information is transferred or provided over a network or another communications connection (either hardwired, wireless, or a combination of hardwired or wireless) to a computer, the computer properly views the connection as a computer readable medium. Thus, any such connection is properly termed a computer readable medium. Combinations of the above are also included within the scope of computer readable media.

An exemplary electronic system architecture in which the present invention can be used includes one or more processors, each of which can be configured for rapid recovery from various faults. The term "rapid recovery" indicates that recovery may occur in a very short amount of time, such as within about 1 to 2 computing frames. As used herein, a "computing frame" is the time needed for a particular processor to perform a repetitive task of a computation, e.g., the tasks that need to be calculated continuously to maintain the operation of a controlled plant. In embodiments where faults are detected within a single computing frame, each processor need only store control and logic state variable data for the immediately preceding computing frame for use in recovery purposes, which may take place essentially instantaneously so that it is transparent to the user.

The invention provides for use of common computing resources that can be both reconfigurable and rapidly recoverable. For example, a common computing module can be provided that is both reconfigurable and rapidly recoverable to provide aerospace vehicle functions. Typically, aerospace vehicle functions can have failure effects ranging from catastrophic to no effect on mission success or safety. In control functions requiring rapid real time recovery (e.g., aircraft inner loop stability), the computing module capability provides recovery that is rapid enough such that there would be no effect perceived at the function level. Thus, the recovery is transparent to the function.

In general, a computing system according to embodiments of the invention provides reconfigurable and recoverable computing resources. Such a system comprises one or more processors with a recovery mechanism, the processors configured to execute a first application, and a first additional processor configured to execute a second application different than the first application. The additional processor is reconfigurable with rapid recovery such that the additional processor can execute the first application when one of the one more processors fails. In another embodiment, the system further comprises a second additional processor configured to execute a third application different from the first and second applications. The second additional processor is reconfigurable such that it can execute the second application if the first additional processor fails.

In the following description of various exemplary embodiments of the invention, a particular number of processors are described for each of the computing systems. It should be understood, however, that other embodiments can perform the same functions as described with more or less processors. Thus, the following embodiments are not to be taken as limiting. In addition, some processors are associated with optional recovery mechanisms, since these processors don't always need to store state data to perform their functions when reconfigured.

Figure 1:
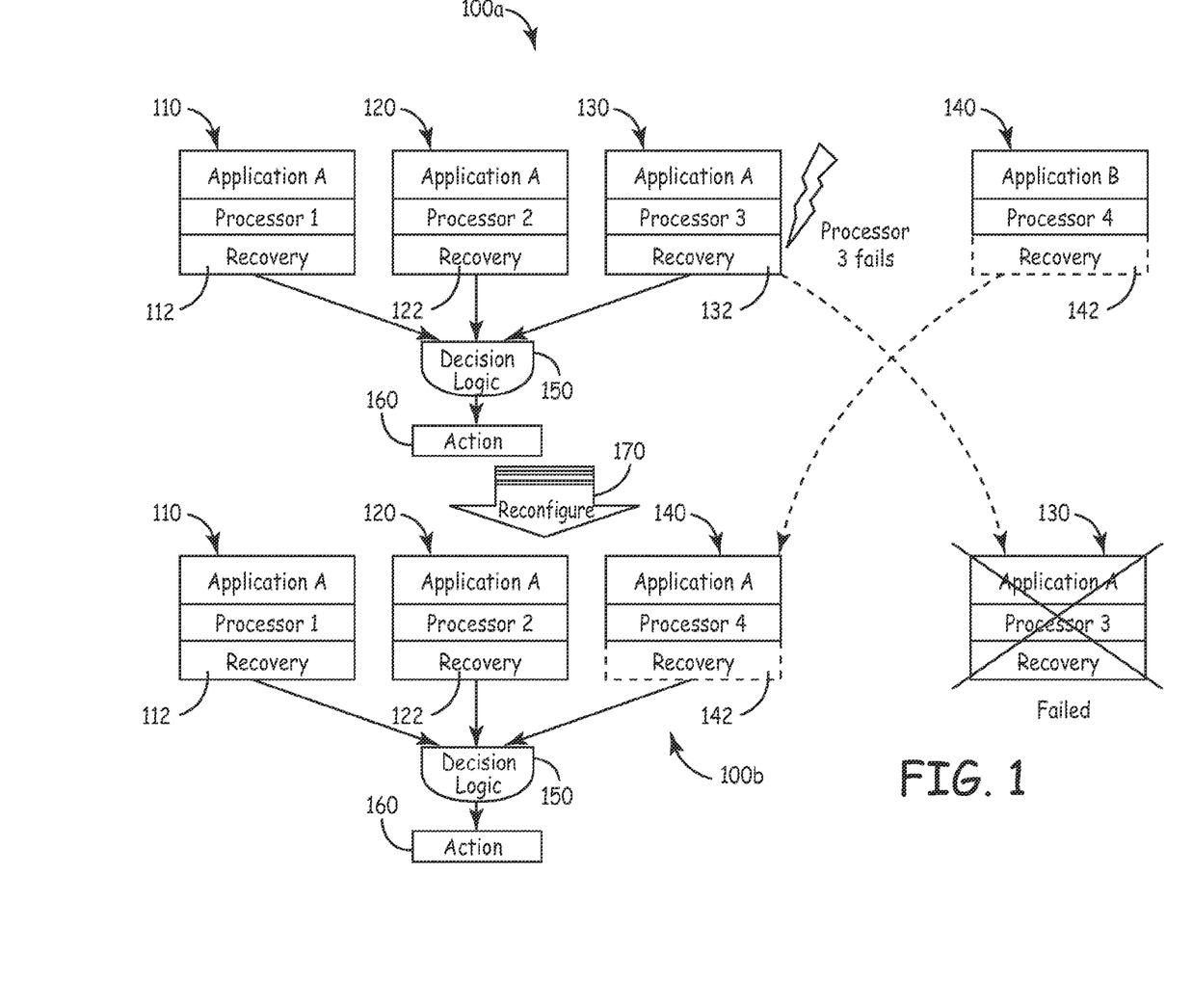
FIG. 1 is a block diagram of one embodiment of a reconfigurable and recoverable computing system.

FIG. 1 depicts a system in which reconfiguration utilizing rapid recovery teleology is provided for maintaining reliability of a control system. As shown, a fault tolerant computing system in a first configuration 100a has a set of three computing resources 110, 120, and 130 that are configured to execute an application A by respective processors 1, 2, and 3. Recovery mechanisms 112, 122, and 132 are also respectively provided in computing resources 110, 120, and 130. Each computing resource 110, 120, and 130 provides an independent output that is operatively connected to a decision logic module 150. The decision logic module 150 implements an algorithm that maintains an appropriate action 160 in the event that one of the processors sends an erroneous output to decision logic module 150.

The minimum number of processors required to implement this scheme is three because only then is it possible to tell which processor is in error by comparison to the outputs of the other processors. Assuming that all three processors are operating correctly from the start and that only one fails at a time, then it is possible for the decision logic to continue to provide an error-free action even after a single processor has failed. The problem is that a second failure would make it impossible for the decision logic to continue to provide the appropriate action because it is not possible with only two inputs to tell which processor has failed. One solution is to have four or more processors executing the same application so it is possible to continue correct operation after the second failure.

As depicted in FIG. 1, a fourth computing resource 140 is provided with an optional recovery mechanism 142. The processor 4 of computing resource 140 is not initially executing the same application A as computing resources 110, 120, and 130. Instead, processor 4 is executing application B. The processor 4 does not need to execute application A because three outputs are sufficient for decision logic module 150 to decide which processor has failed for the first failure. The first configuration 100a is reconfigured (170), after one of processors 1-3 has failed, into a second configuration 100b. Processor 4 is used to execute application A and provide the third output to decision logic module 150 that was formerly being provided by the now failed processor. For example, if processor 3 fails it is stopped from affecting the control output being sent from decision logic module 150 and is replaced by processor 4, which is reconfigured with recovery data from processor 1/application A to maintain the redundancy level. Utilizing such reconfiguration and rapid recovery minimizes the hardware resources required to support both reliability and availability.

The system architecture of FIG. 1 provides the ability to reconfigure a processor and begin executing a different application when needed. To ensure that the system provides the required level of reliability as before, the reconfiguration must occur in a sufficiently short time that the probability of the second processor failure occurring between the time that the first failure occurs and the reconfiguration is completed is very small. The recovery mechanisms in the computing resources store state information relevant to the executing application. In the event of one or more computing errors, it is possible for a processor to continue executing using the stored state information that was previously saved during an earlier computation cycle. This same state data is also used to rapidly reconfigure the fourth processor to execute a critical application in the event of a non-recoverable error in any of the three redundant processors. Without this state data, the amount of time required to bring another processor on-line would be greatly extended.

Figure 2:
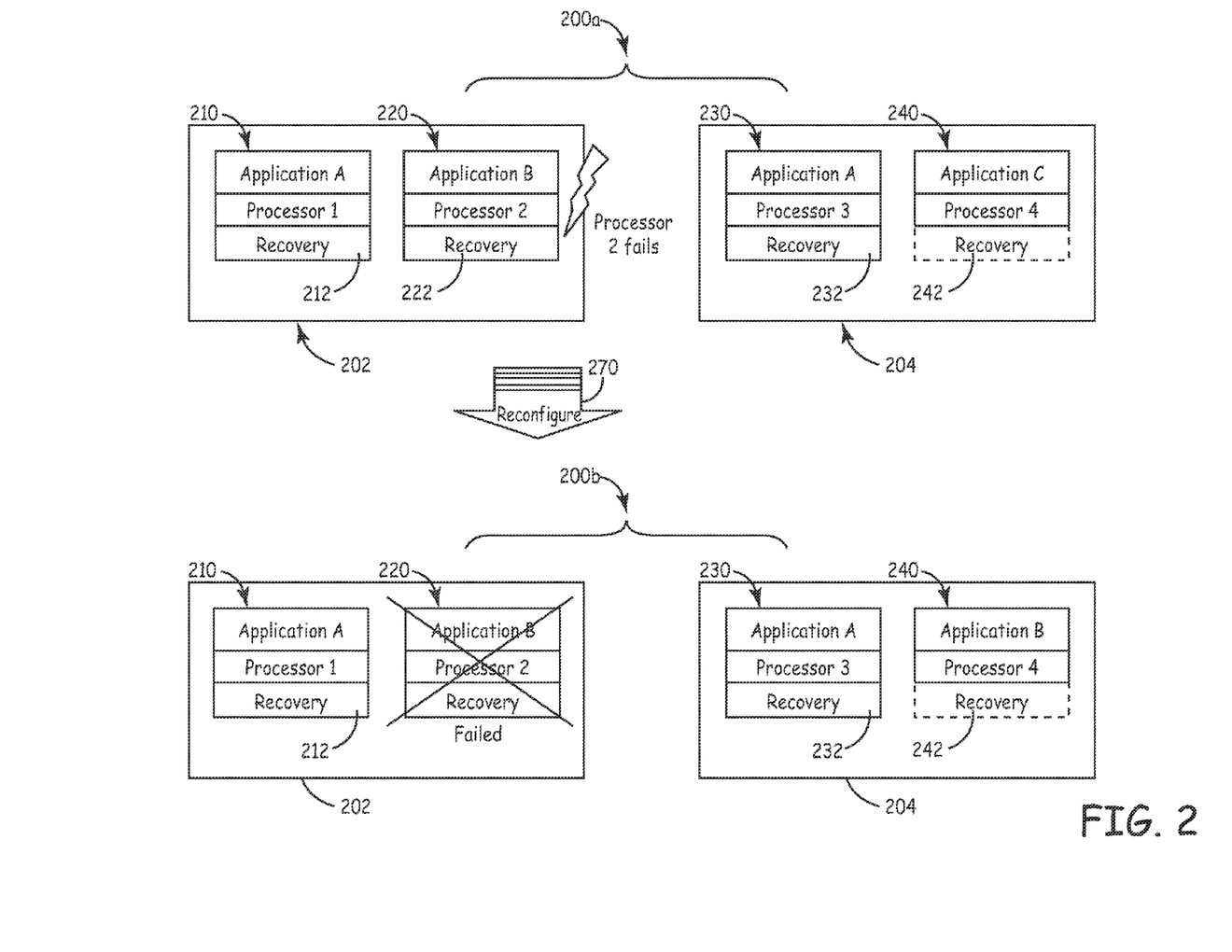
FIG. 2 is a block diagram of another embodiment of a reconfigurable and recoverable computing system.

FIG. 2 illustrates a fault tolerant computing system according to another embodiment that employs a reconfiguration method utilizing rapid recovery to minimize the hardware computing resources needed to achieve and maintain required functional availability. A first configuration 200a of the computing system has a first computing platform 202 and a second computing platform 204, such as left and right cabinets in a flight control computer system. The computing platform 202 includes a set of computational resources 210 and 220. The computing platform 204 includes a set of computational resources 230 and 240. Recovery mechanisms 212, 222, and 232, are respectively provided in computational resources 210, 220, and 230. The computational resource 240 is provided with an optional recovery mechanism 242.

The computational resources 210 and 220 are configured to respectively execute applications A and B by respective processors 1 and 2. The computational resources 230 and 240 are configured to respectively execute applications A and C by respective processors 3 and 4. Thus, application A is redundantly hosted in processors 1 and 3. Application B is not redundant and is hosted only in processor 2. Application C, which has the least critical function is hosted only in processor 4.

As shown in FIG. 2, rapid recovery is used with a consistent set of state data to reconfigure (270) the first configuration 200a, which is hosting a non-essential application, into a second configuration 200b. For example, application B state data is continuously updated in recovery mechanism 222. If an unrecoverable failure is detected in processor 2, processor 4 is reconfigured with recovery data from processor 2 in order to host application B and thus maintain the availability of application B. Application C originally running on processor 4 is not required to meet the minimum system functionality and hence is superseded by the more critical application B.

The availability of fresh and consistent state data provided by the rapid recovery technique ensures rapid initialization of critical applications. Reconfiguration allows the system to meet functional availability requirements without immediate removal and replacement of a faulted computational element. Without rapid recovery, starting application B on processor 4 would require a lengthy initialization period to become initialized and synchronized with the system. An immediate maintenance action would be required to diagnose and replace the faulty computational element and then restart the system without reconfiguration.

In a further embodiment, a computing system employs reconfiguration and rapid recovery to minimize hardware resources required to support both reliability and availability. The speed of the reconfiguration transition can be essentially real-time when rapid recovery is used. The transitions between system configurations are used to achieve reliability and availability of the computational elements.

In a first configuration of this computing system, a number of independent applications are executed on independent computational resources. For example, a computing system can include a first processor with a recovery mechanism that is configured to execute a first application, and one or more additional processors configured to execute one or more applications that are different from the first application. The first configuration is employed to achieve an availability of functions during a particular phase of a use, such as a flight mission for example. A first application is executed on one of the computational resources, which utilizes rapid recovery to create a reliable backup of state data variables. Other applications are executed on the additional computational resources.

During the next phase of a use such as a mission, the first application needs to support a highly reliable operation. This is achieved in the computing system architecture by implementing a redundancy of computing resources in a second configuration to achieve reliability. For example, the one or more additional processors are reconfigurable such that they can execute the first application when needed for redundancy. The one or more additional processors are reconfigured with recovery data from the first application/processor. Additionally, the one or more additional processors can be further reconfigured to execute the one or more applications again that are different from the first application when redundancy is no longer required.

Figure 3:
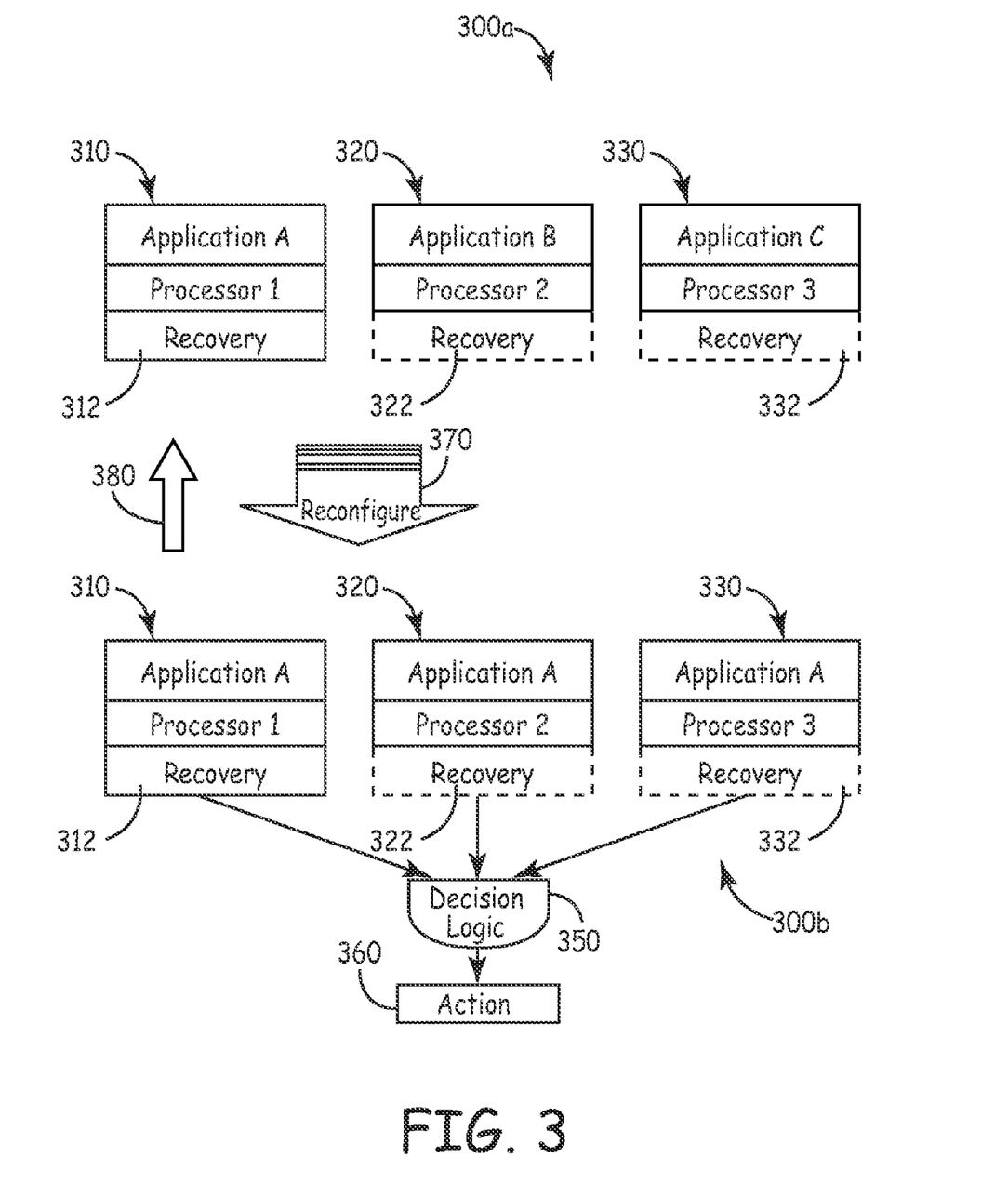
FIG. 3 is a block diagram of a further embodiment of a reconfigurable and recoverable computing system.

This embodiment is further illustrated in FIG. 3. A computing system in a first configuration 300a includes a set of three computational resources 310, 320, and 330 that are configured to respectively execute different applications A, B, and C by respective processors 1, 2, and 3. A recovery mechanism 312 is provided in computational resource 310 for rapid recovery. The computational resources 320 and 330 can include optional recovery mechanisms 322 and 332, respectively.

If application A needs to support a highly reliable operation, computational resources 320 and 330 are reconfigured (370) to become redundant channels for application A as shown in a second configuration 300b of FIG. 3. Each of computational resources 310, 320, and 330 in configuration 300b can provide an independent output that is fed to a decision logic module 350. The decision logic module 350 implements an algorithm that maintains an appropriate action 360 in the event that one of the processors in computational resources 310, 320, or 330 sends an erroneous output to decision logic module 350.

Once the highly reliable operation is no longer needed, the computing system can be returned (380) to the first configuration 300a. In a cyclic scenario, the computing system can be reconfigured between first and second configurations 300a and 300b as often as needed for a particular use.

Without rapid recovery, the initial states of the reconfigured computational resources 320 and 330 (with processors 2 and 3) would not be in-sync with application A executing on processor 1. It would typically require some time period of operation before the states of the re-configured computational resources (processors 2 and 3) would reach the same state as the original application A on processor 1. But with rapid recovery, the operational state variables of application A on processor 1 from a previous computing frame can be loaded into the reconfigured processors 2 and 3 just prior to their execution of application A. This allows the initial states of the reconfigured computational resources to be essentially in-sync with the original state of processor 1.

Figure 4:
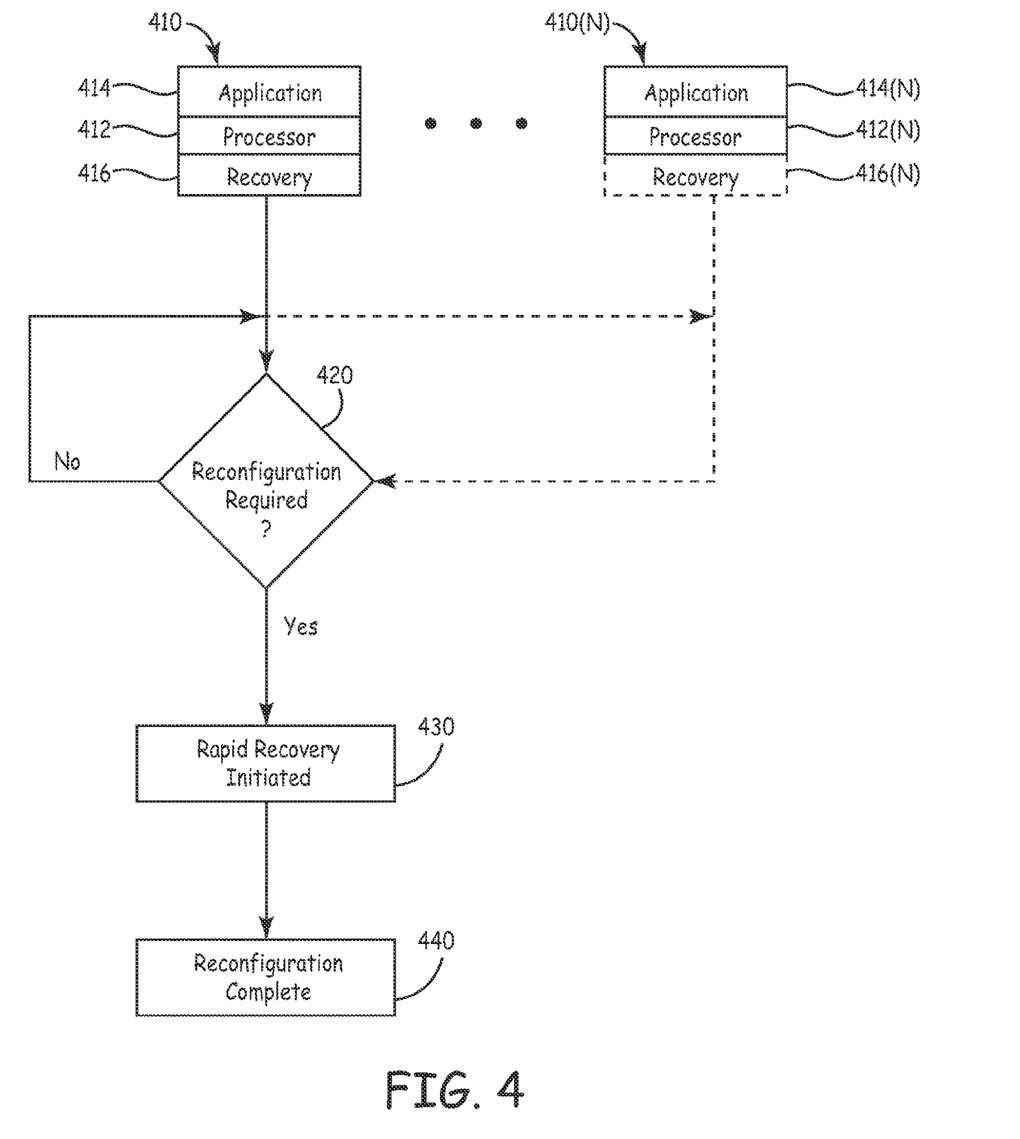
FIG. 4 is a processing flow diagram for a method for optimizing the use of digital computing resources to achieve reliability and availability.

FIG. 4 illustrates a method for optimizing the use of digital computing resources to achieve reliability and availability. At least one computational resource 410 is provided with a processor 412 that is configured to execute an application 414. A recovery mechanism 416 is provided in computational resource 410 for rapid recovery. One or more additional computational resources 410(N) can be optionally provided with one or more processors 412(N) if desired depending upon the use intended for the computational resources. Such additional computational resources can be configured to execute one or more applications 414(N), which can be the same as or different from application 414. The additional computational resources can include an optional recovery mechanism 416 (N) if desired.

During operation, a determination is made at 420 whether reconfiguration is required for computational resource 410 (and when present, computational resources 410(N)). If not, then computational resource(s) 410 (410(N)) continues normal operations in executing application(s) 414 (414(N)). If reconfiguration is required, then a rapid recovery is initiated at 430 using state data stored in recovery mechanism(s) 416 (416(N)). The reconfiguration of processor(s) 412 (412(N)) is complete at 440 after rapid recovery occurs.

In one embodiment, a recoverable real time multi-tasking computer system is provided. The system comprises a real time computing platform, wherein the real time computing platform is adapted to execute one or more applications, wherein each application is time and space partitioned. The system further comprises a fault detection system adapted to detect one or more faults affecting the real time computing environment, and a fault recovery system. Upon the detection of a fault by the fault detection system, the fault recovery system is adapted to restore a backup set of state variables.

In one embodiment, lock-step fault detection allows a system to detect upset events almost immediately. Traditional lock step processing implies that two or more processors are executing the same instructions at the same time. Self-checking lock-step computing provides the cross feeding of signals from one processing lane to the other processing lane and then compares them for deviations on every single clock edge.

Figure 5:
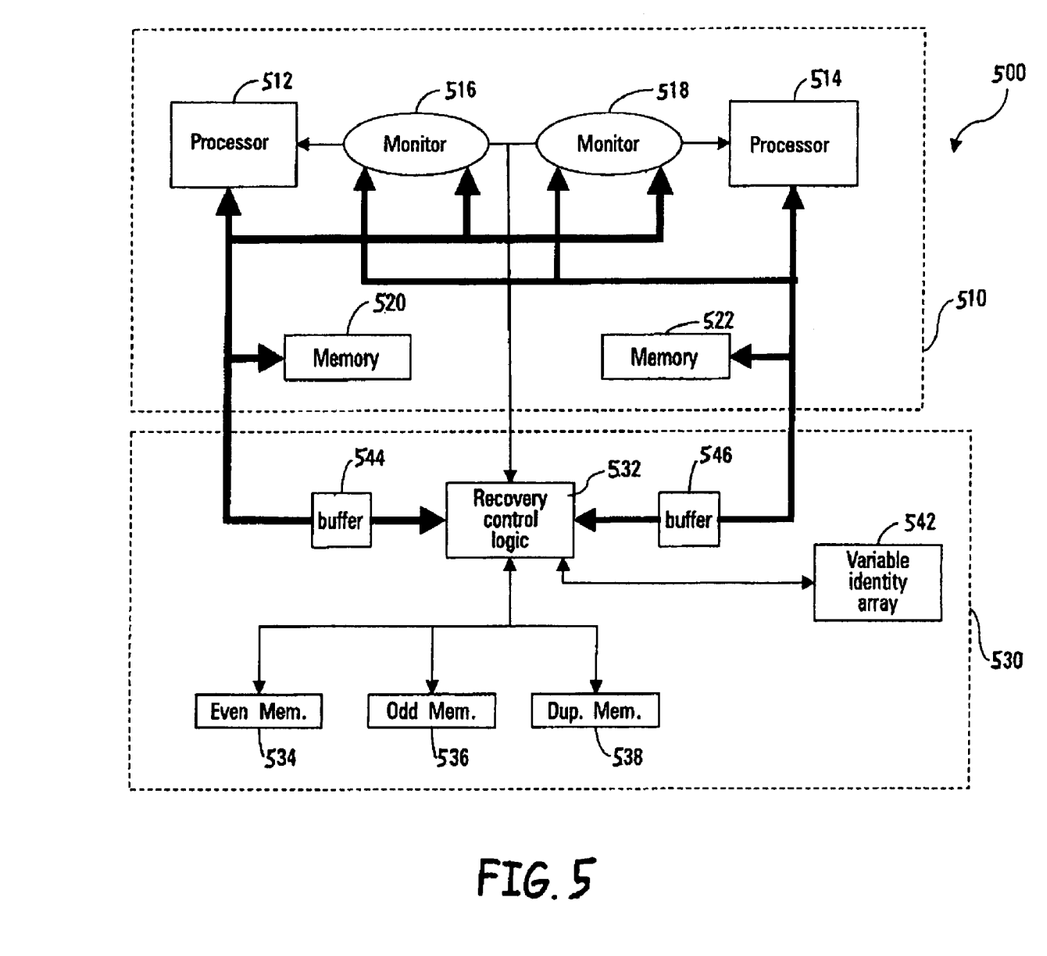
FIG. 5 is a block diagram illustrating a fault recovery system according to one embodiment.

FIG. 5 illustrates one embodiment 500 of a self-checking lock-step computing lane 510 of one embodiment of the present invention. Self-checking lock-step computing lane 510 comprises at least two sets of duplicate processors (512 and 514), memories (520 and 522), and fault detection monitors (516 and 518). On every single system clock edge, monitors 516 and 518 both compare the data bus signal and control bus signal output of processors 512 and 514 against each other. When the output signals fail to correlate, monitors 516 and 518 identify a fault. This guarantees that if one processor deviates (e.g., because it retrieves a wrong address or is provided a wrong data bit) one or both of monitors 516 and 518 will detect the fault on the next clock edge. The fault is thus detected in the same computational frame in which it was generated. In one embodiment, when either monitor 516 or monitor 518 detects a fault, the monitor notifies processors 512 and 514. In embodiments of the present invention, upon notification of a fault, processors 512 and 514 shut off further processing of the application which was executing in the faulted computational frame and the fault recovery system is invoked.

In operation, in one embodiment, processors 512 and 514 hold state variables for applications in respective memories 520 and 522. The memory locations in memories 520 and 522 used by each application to store state variables as the applications are executed in their respective computational frame are referred to as "scratchpad memories." Fault recovery system 530 creates a duplicate copy of the state variables stored in memories 520 and 522, creating a repository of recent state variable data sets. Fault recovery system 530 stores off the state variables in real time, as processors 512 and 514 are executing and storing the state variables in memories 520 and 522.

In one embodiment, as state variable values are produced by processors 512 and 514 and stored in memories 520 and 522, there is a redundant copy made in duplicate memory 538. In one embodiment, duplicate memory 538 is contained in a highly isolated location to ensure the robustness of the data stored in duplicate memory 538. In one embodiment, duplicate memory 538 is protected from corruption by one or more of a metal enclosure, signal buffers (such as buffers 544 and 546) and power isolation.

One skilled in the art will recognize that it is undesirable to load duplicate memory 538 with state variable data in situations where the system only partially completed a computing frame when the fault occurred. This is because duplicate memory 538 could end up storing corrupted data for that computing frame. Instead, to ensure that a complete valid frame of state variable data is in the duplicate memory and available for restoration, embodiments of the present invention provide intermediate memories. In one embodiment, a duplicate of memories 520 and 522 for even computational frames is loaded into even frame memory 534. A duplicate of memories 520 and 522 for odd computational frames is loaded into odd frame memory 536. The even frame memory 534 and odd frame memory 536 toggle back and forth copying data into the duplicate memory 538 to ensure that a complete valid backup memory is maintained. Even frame memory 534 and odd frame memory 536 will only copy their contents to duplicate memory 538 if the intermediate memories themselves contain a complete valid state variable backup for a computing frame that successfully completes, its execution.

In one embodiment, fault recovery system 530 also includes a variable identity array 542, which provides for the efficient use of memory storage. In one embodiment, instead of creating backup copies of every state variable for every application, variable identity array 542 identifies a subset of predefined state variables which allows recovery control logic 532 to backup only those state variables desired for certain applications into duplicate memory 538. In one embodiment, only state variables for predefined applications are included in the predefined subset of state variables that are duplicated into duplicate memory 538. In one embodiment, variable identity array 542 contains predefined state variable locations on an address-by-address basis. In one embodiment, variable identity array 542 allows only the desired state variable data to load into the intermediate memories.

When recovery control logic 532 is notified of a detected fault, recovery control logic 532 retrieves the duplicate state variables for an upset application from duplicate memory 538 and restores those state variables into the upset application's scratchpad memory area of memories 520 and 522. In one embodiment, once the duplicate state variables are restored into memories 520 and 522, recovery control logic 532 notifies monitors 516 and 518, and processors 212, 214 resume execution of the upset application using the restored state variables.

In another embodiment of the present invention, monitors 516 and 518 are adapted to notify the faulted application of the occurrence of a fault, instead of notifying recovery control logic 532. In operation, in one embodiment, upon detection of a fault affecting an application, the monitor notifies processors 512 and 514, which shut off processing of the upset application. On the upset application's next processing frame, at least one of processors 512 and 514 notify the faulted application of the occurrence of the fault. In one embodiment, upon notification of the fault, the upset application is adapted to request the recovery of state variables by notifying recovery control logic 532. In one embodiment, once the duplicate state variables are restored into memories 520 and 522, recovery control logic 532 notifies monitors 516 and 518, and processors 512 and 514 resume execution of the upset application using the restored state variables.

The present invention may be embodied in other specific forms without departing from its essential characteristics. The described embodiments and methods are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A method for optimizing the use of digital computing resources to achieve reliability and availability of the digital computing resources, the method comprising:
   providing one or more processors with a recovery mechanism, the one or more processors executing one or more applications, the recovery mechanism comprising:
      a duplicate memory;
      an even frame memory, wherein the recovery mechanism is configured to duplicate state variables computed by a real time computing platform dining even computational frames into the even frame memory; and
      an odd frame memory, wherein the recovery mechanism is configured to duplicate state variables computed by the real time computing platform during odd computational frames into the odd frame memory;
      wherein the even frame memory and the odd frame memory toggle back and forth duplicating state variables into the duplicate memory for computational frames in which no fault is detected;
   determining whether the one or more processors needs to be reconfigured; and
   employing a rapid recovery to reconfigure the one or more processors when needed;
   wherein upon determining the need to reconfigure, the recovery mechanism restores a duplicate set of state variables into one or more scratchpad memories for the one or more processors.

2. The method of claim 1, wherein state data is continuously updated in the recovery mechanism.

3. The method of claim 2, wherein the state data is used to transfuse the one or more processors for reconfiguration.

4. The method of claim 1, wherein the method provides real-time reconfiguration transitions.

5. The method of claim 1, wherein the method provides for one less than a predetermined set of processing hardware to achieve reliability and availability for functions being provided.

6. An electronic system architecture that is configured to implement the method of claim 1.

7. A computing system that provides reconfigurable and recoverable computing resources, the system comprising:
   a real time computing platform;
   one or more scratchpad memories in the computing platform;
   one or more processors with a recovery mechanism in the computing platform, the one or more processors configured to execute a first application, the recovery mechanism comprising:
      a duplicate memory;
      an even frame memory, wherein the recovery mechanism is configured to duplicate state variables computed by the real time computing platform during even computational frames into the even frame memory; and
      an odd frame memory, wherein the recovery mechanism is configured to duplicate state variables computed by the real time computing platform during odd computational frames into the odd frame memory;
      wherein the even frame memory and the odd frame memory toggle back and forth duplicating state variables into the duplicate memory for computational frames in which no fault is detected;
   a first additional processor configured to execute a second application different than the first application;
   wherein the additional processor is reconfigurable with rapid recovery such that the additional processor can execute the first application when one of the one more processors fails; and
   wherein upon determining a need to reconfigure, the recovery mechanism restores a duplicate set of state variables into the one or more scratchpad memories.

8. The system of claim 7, wherein the one or more processors are in operative communication with a decision logic module prior to any failure.

9. The system of claim 8, wherein the decision logic module implements an algorithm that maintains an appropriate action in the event that one of the one or more processors sends an erroneous output to the decision logic module.

10. The system of claim 8, wherein the additional processor is in operative communication with the decision logic module when the additional processor is reconfigured, and a failed processor is removed from communication with the decision logic module.

11. The system of claim 7, wherein the additional processor is reconfigured with recovery data from a processor that has not failed to maintain a level of redundancy.

12. The system of claim 7, wherein the recovery mechanism in the one or more processors stores state data relevant to executing the first application.

13. The system of claim 12, wherein the state data is used to reconfigure the additional processor.

14. The system of claim 7, further comprising a second additional processor configured to execute a third application different from the first and second applications.

15. The system of claim 14, wherein the second additional processor is reconfigurable such that it can execute the second application if the first additional processor fails.

16. The system of claim 14, wherein the second additional processor is reconfigured with a consistent set of state data from a recovery mechanism of the first additional processor.

17. A computing system that provides reconfigurable and recoverable computing resources, the system comprising:
    a real time computing platform;
    a scratchpad memory in the computing platform;
    a first processor with a recovery mechanism in the computing platform, the first processor configured to execute a first application, the recovery mechanism comprising:
        a duplicate memory;
        an even frame memory, wherein the recovery mechanism is configured to duplicate state variables computed by the real time computing platform during even computational frames into the even frame memory; and
        an odd frame memory, wherein the recovery mechanism is configured to duplicate state variables computed by the real time computing platform during odd computational frames into the odd frame memory;
        wherein the even frame memory and the odd frame memory toggle back and forth duplicating state variables into the duplicate memory for computational frames in which no fault is detected;
    one or more additional processors configured to execute one or more applications that are different from the first application;
    wherein the one or more additional processors are reconfigurable such that they can execute the first application when needed for redundancy while the first processor is executing the first application, and wherein the one or more additional processors can be further reconfigured to execute the one or more applications again that are different from the first application when redundancy is no longer required; and
    wherein upon determining a need to reconfigure, the recovery mechanism restores a duplicate set of state variables into the scratchpad memory.

18. The system of claim 17, wherein state data is continuously updated in the recovery mechanism of the first processor.

19. The system of claim 18, wherein the one or more additional processors are reconfigured with a consistent set of state data from the recovery mechanism of the first processor.

20. The system of claim 17, wherein the first processor and the one or more additional processors are in operative communication with a decision logic module after reconfiguration of the one or more additional processors.

* * * * *